US011100726B2

(12) United States Patent
Krupa et al.

(10) Patent No.: US 11,100,726 B2
(45) Date of Patent: Aug. 24, 2021

(54) SYSTEMS AND METHODS FOR REAL-TIME STREAMING OF FLIGHT DATA

(71) Applicant: Honeywell International Inc., Morris Plains, NJ (US)

(72) Inventors: Miroslav Krupa, Brno (CZ); Pavel Urbanek, JMK (CZ); Timothy D. Mahoney, Chandler, AZ (US); Lori Murphy, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 5 days.

(21) Appl. No.: 15/995,692

(22) Filed: Jun. 1, 2018

(65) Prior Publication Data
US 2019/0371084 A1    Dec. 5, 2019

(51) Int. Cl.
*G07C 5/00* (2006.01)
*G07C 5/08* (2006.01)
*G08G 5/00* (2006.01)
*H04L 29/06* (2006.01)

(52) U.S. Cl.
CPC ........... *G07C 5/008* (2013.01); *G07C 5/0808* (2013.01); *G07C 5/0816* (2013.01); *G07C 5/0841* (2013.01); *G08G 5/0026* (2013.01); *H04L 65/4069* (2013.01)

(58) Field of Classification Search
CPC .... G07C 5/008; G07C 5/0816; G07C 5/0841; G07C 5/0808; G08G 5/0026; G08G 5/004; G08G 5/0013; H04L 65/4069; H04L 7/18506; H04L 7/18508
USPC .......................................................... 701/14
See application file for complete search history.

(56) References Cited

U.S. PATENT DOCUMENTS

| 4,660,145 A * | 4/1987 | Hansen | H03M 7/30 701/14 |
| 5,627,753 A * | 5/1997 | Brankin | G01D 9/005 369/21 |
| 6,009,356 A * | 12/1999 | Monroe | B64D 45/0015 701/14 |
| 6,167,239 A | 12/2000 | Wright et al. | |
| 6,392,692 B1 | 5/2002 | Monroe | |
| 6,549,162 B1 | 4/2003 | Gage et al. | |
| 6,577,419 B1 | 6/2003 | Hall et al. | |

(Continued)

FOREIGN PATENT DOCUMENTS

| CA | 2808829 A1 | 9/2013 |
| GB | 2497674 A | 6/2013 |

(Continued)

OTHER PUBLICATIONS

EP Examination Report, issued in corresponding EP 19177525.3, dated Apr. 8, 2021 (9 pages).

*Primary Examiner* — Fadey S. Jabr
*Assistant Examiner* — Mohamed Abdo Algehaim
(74) *Attorney, Agent, or Firm* — Bookoff McAndrews, PLLC (57) ABSTRACT

A computer-implemented method for real-time streaming of flight data includes receiving flight data from one or more aircraft data sensors, evaluating the received flight data according to data evaluation rules, and upon determining that the received flight data matches one or more conditions specified in the data evaluation rules, starting or stopping a transmission of the received flight data to a ground station.

20 Claims, 11 Drawing Sheets

(56) References Cited

U.S. PATENT DOCUMENTS

| | | | |
|---|---|---|---|
| 6,735,505 B2 * | 5/2004 | Levine | B64D 45/00 701/33.4 |
| 6,876,905 B2 | 4/2005 | Farley et al. | |
| 7,039,509 B2 | 5/2006 | Podowski | |
| 7,049,953 B2 | 5/2006 | Monroe | |
| 7,103,456 B2 | 9/2006 | Bloch et al. | |
| 7,113,852 B2 | 9/2006 | Kapadia et al. | |
| 7,203,630 B2 | 4/2007 | Kolb et al. | |
| 7,271,740 B2 * | 9/2007 | Fischer | B64D 45/0015 340/945 |
| 7,437,225 B1 | 10/2008 | Rathinam | |
| 7,489,992 B2 | 2/2009 | Valette et al. | |
| 8,019,337 B2 | 9/2011 | Galy et al. | |
| 8,386,100 B1 | 2/2013 | Lie | |
| 8,390,468 B2 | 3/2013 | Yang et al. | |
| 8,548,547 B2 | 10/2013 | Vij | |
| 8,565,940 B2 | 10/2013 | Roquelaure et al. | |
| 8,798,148 B2 | 8/2014 | Kostrzewski et al. | |
| 9,193,478 B2 | 11/2015 | Girod et al. | |
| 9,221,551 B2 * | 12/2015 | Leroy | G08G 5/0008 |
| 9,285,294 B2 | 3/2016 | Jordan et al. | |
| 9,313,276 B2 | 4/2016 | Pereira | |
| 9,440,749 B1 | 9/2016 | Ye et al. | |
| 9,540,119 B1 * | 1/2017 | Heinrich | H04W 4/029 |
| 9,563,580 B2 | 2/2017 | Warner et al. | |
| 9,586,693 B1 | 3/2017 | Heinrich | |
| 9,602,187 B2 * | 3/2017 | Jacobs | G08G 5/0052 |
| 9,718,557 B2 | 8/2017 | Zubairi | |
| 9,738,398 B1 * | 8/2017 | Wang | G01S 15/66 |
| 9,746,851 B2 | 8/2017 | Chai et al. | |
| 9,771,160 B2 | 9/2017 | Ye et al. | |
| 9,807,670 B2 | 10/2017 | Vermande et al. | |
| 9,828,112 B2 | 11/2017 | Girod et al. | |
| 9,831,937 B2 | 11/2017 | Pichavant et al. | |
| 9,849,044 B1 * | 12/2017 | Groden | B64D 45/04 |
| 9,887,762 B2 | 2/2018 | Bigot et al. | |
| 9,934,620 B2 | 4/2018 | Byrd | |
| 9,934,623 B2 | 4/2018 | Jordan et al. | |
| 10,075,228 B2 * | 9/2018 | Klippert | H04B 7/155 |
| 2002/0035416 A1 * | 3/2002 | De Leon | G07C 5/008 701/14 |
| 2003/0152145 A1 * | 8/2003 | Kawakita | H04N 7/083 375/240.12 |
| 2005/0097515 A1 * | 5/2005 | Ribling | G06F 11/3672 717/124 |
| 2005/0267653 A1 * | 12/2005 | Matsushita | G07C 5/008 701/14 |
| 2008/0039997 A1 | 2/2008 | Kolb et al. | |
| 2010/0063654 A1 * | 3/2010 | Winterhalter | G01S 5/18 701/14 |
| 2011/0125348 A1 * | 5/2011 | Sandell | G07C 5/008 701/14 |
| 2011/0246002 A1 * | 10/2011 | Shavit | G08G 5/0026 701/14 |
| 2012/0095624 A1 * | 4/2012 | Budan | G07C 5/0858 701/14 |
| 2012/0191273 A1 | 7/2012 | Jacobs et al. | |
| 2013/0083960 A1 * | 4/2013 | Kostrzewski | H05K 7/1427 382/103 |
| 2013/0111273 A1 * | 5/2013 | Larsen | G06F 11/3495 714/45 |
| 2013/0132522 A1 * | 5/2013 | Ruppin | B64D 45/0015 709/219 |
| 2013/0158751 A1 * | 6/2013 | Cornell | G07C 5/008 701/14 |
| 2013/0244588 A1 * | 9/2013 | Pereira | H04L 67/12 455/73 |
| 2013/0274954 A1 | 10/2013 | Jordan et al. | |
| 2013/0274964 A1 * | 10/2013 | Jesse | G05D 1/0077 701/14 |
| 2013/0317673 A1 * | 11/2013 | Leroy | G08G 5/0008 701/14 |
| 2014/0347481 A1 | 11/2014 | Kostrzewski et al. | |
| 2015/0203212 A1 * | 7/2015 | Zubairi | B64D 45/00 701/14 |
| 2015/0221141 A1 * | 8/2015 | Negritto | G06F 16/958 701/31.5 |
| 2015/0339241 A1 * | 11/2015 | Warner | G06F 13/10 710/74 |
| 2015/0363981 A1 * | 12/2015 | Ziarno | H04B 1/3822 701/101 |
| 2016/0019798 A1 * | 1/2016 | Agrawal | B64D 45/00 701/14 |
| 2016/0055754 A1 * | 2/2016 | Ling | G08G 5/0056 701/14 |
| 2016/0075443 A1 * | 3/2016 | Schmutz | G08G 5/0021 701/14 |
| 2016/0093124 A1 * | 3/2016 | Shi | B64D 47/08 701/2 |
| 2016/0176538 A1 * | 6/2016 | Bekanich | B64D 45/00 701/14 |
| 2016/0233948 A1 | 8/2016 | Le Bigot et al. | |
| 2016/0260264 A1 * | 9/2016 | Shih | G07C 5/008 |
| 2017/0063944 A1 | 3/2017 | Nyikos et al. | |
| 2017/0106997 A1 * | 4/2017 | Bekanich | G08B 25/006 |
| 2017/0141839 A1 | 5/2017 | Chiodini et al. | |
| 2017/0178420 A1 * | 6/2017 | Byrd, Jr. | G07C 5/008 |
| 2017/0199833 A1 | 7/2017 | Warner et al. | |
| 2017/0236429 A1 * | 8/2017 | Stark | G08G 5/025 701/14 |
| 2018/0044034 A1 | 2/2018 | Newman et al. | |
| 2018/0061243 A1 | 3/2018 | Shloosh | |
| 2018/0091217 A1 | 3/2018 | Christomanos | |
| 2018/0205658 A1 * | 7/2018 | Sullivan | H04W 4/42 |
| 2019/0130667 A1 * | 5/2019 | Carro | G07C 5/02 |
| 2020/0119806 A1 * | 4/2020 | Carro | H04L 65/4069 |
| 2020/0302801 A1 * | 9/2020 | Urbanek | H04B 7/18508 |
| 2021/0001999 A1 * | 1/2021 | Massa | H04N 7/18 |

FOREIGN PATENT DOCUMENTS

| | | | | |
|---|---|---|---|---|
| WO | | 2003066434 A2 | 8/2003 | |
| WO | WO-2016203322 A2 * | | 12/2016 | B64C 39/024 |

* cited by examiner

SYSTEMS AND METHODS FOR REAL-TIME STREAMING OF FLIGHT DATA

TECHNICAL FIELD

Various embodiments of the present disclosure relate generally to the field of flight data processing and, more particularly, to real-time streaming of flight data.

BACKGROUND

Many aircraft, including most commercial aircraft, are equipped with flight data recorders (FDRs) and cockpit voice recorders (CVRs). These recorders are often combined in a single unit commonly referred to as the "black box" or "flight recorder." The FDR records the recent history of a flight through numerous parameters collected several times per second. The CVR records the sounds in the cockpit, including the conversation of the pilots. These recordings are often used to understand the circumstances of an accident or other event under investigation. However, recovery of the data recorded by the FDR and CVR requires that the recorders be located and recovered after an incident, and that the recorded data is not damaged in an incident. Such recovery may be difficult or impossible in some circumstances, such as a crash of an aircraft in a deep ocean environment. Furthermore, the recorded data cannot be accessed until after the recorders have been recovered, thus preventing safety or support personnel on the ground from accessing the real-time data to better understand the condition of the aircraft or an incident in progress.

The present disclosure is directed to overcoming one or more of these above-referenced challenges.

SUMMARY OF THE DISCLOSURE

According to certain aspects of the present disclosure, systems and methods are disclosed for real-time streaming of flight data.

In one embodiment, a computer-implemented method is disclosed for real-time streaming of flight data, the method comprising: receiving flight data from one or more aircraft data sensors, evaluating the received flight data according to data evaluation rules, and upon determining that the received flight data matches one or more conditions specified in the data evaluation rules, starting or stopping a transmission of the received flight data to a ground station.

In accordance with another embodiment, a system is disclosed for real-time streaming of flight data, the system comprising: a communication module and a real-time access recorder (RTAR), the RTAR comprising: a data storage device storing instructions for real-time streaming of flight data in an electronic storage medium, and a processor configured to execute the instructions to perform a method including: receiving flight data from one or more aircraft data sensors, evaluating the received flight data according to data evaluation rules, and upon determining that the received flight data matches one or more conditions specified in the data evaluation rules, starting or stopping a transmission of the received flight data to a ground station.

In accordance with another embodiment, a non-transitory machine-readable medium storing instructions that, when executed by a computing system, causes the computing system to perform a method for real-time streaming of flight data, the method including: receiving flight data from one or more aircraft data sensors, evaluating the received flight data according to data evaluation rules, and upon determining that the received flight data matches one or more conditions specified in the data evaluation rules, starting or stopping a transmission of the received flight data to a ground station.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to real-time streaming of flight data.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Any suitable system infrastructure may be put into place to allow real-time streaming of flight data. The accompanying drawings and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in the accompanying drawings. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 1:
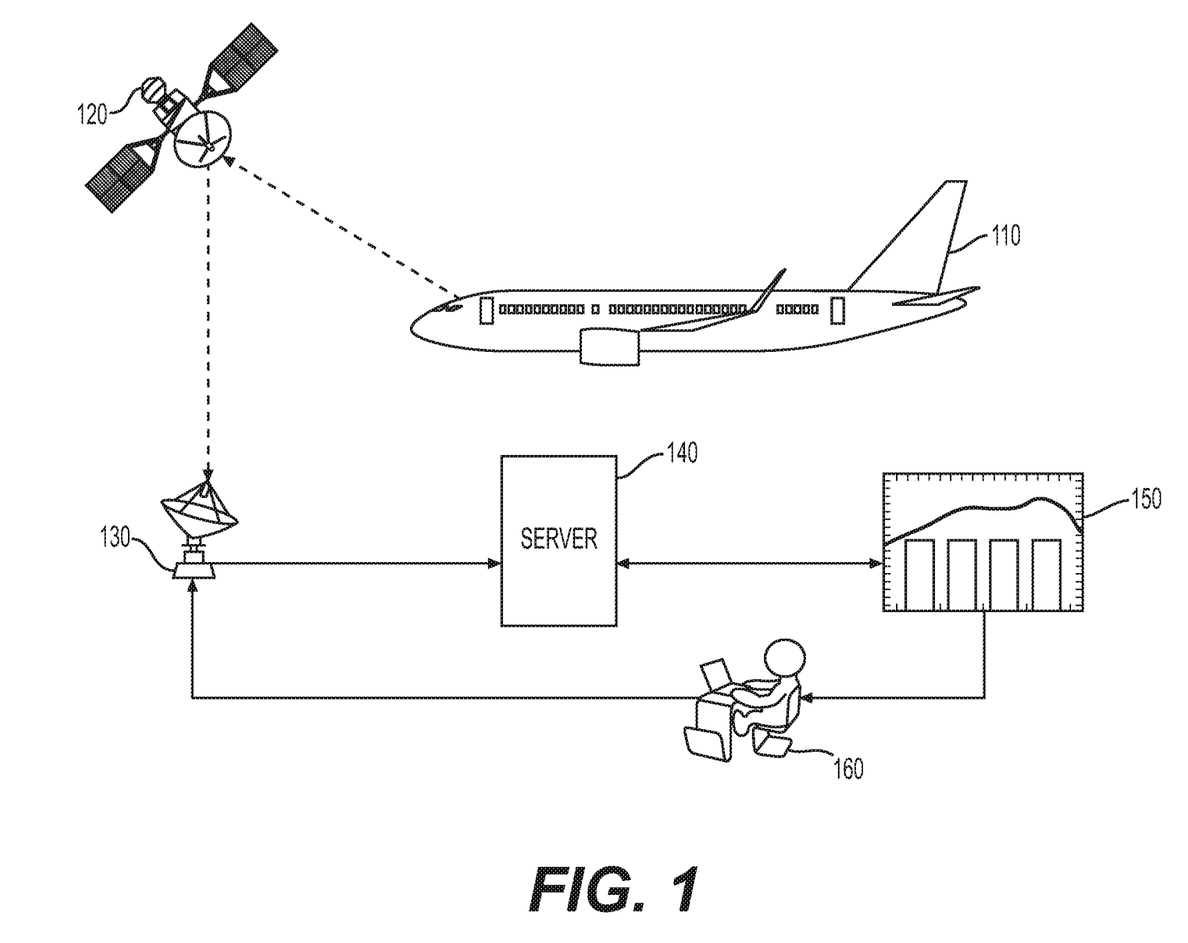
FIG. 1 depicts an exemplary operating environment for real-time streaming of flight data, according to one or more embodiments.

FIG. 1 depicts an exemplary operating environment for real-time streaming of flight data, according to one or more embodiments. As shown in FIG. 1, flight data systems aboard an aircraft 110 may stream flight data to a ground station 130 by way of a satellite 120. Ground station 130 may then transmit the flight data to a server 140, where it may be stored for further processing. Although data transmission via satellite is depicted in FIG. 1, it is to be understood that other means of data transmission may be employed. For example, flight data may be streamed from aircraft 110 to ground station by way of a cellular data network, a direct radio connection, or other wireless network. Such alternate means of data transmission may stream the flight data directly to server 140 rather than by way of ground station 130. Server 130 may store and maintain data received from multiple aircraft across a fleet of aircraft. The data stored on server 130 may be used to provide analytics 150 to aircraft or fleet operators, such as, for example, flight operational quality assurance (FOQA), flight data monitoring (FDM), flight data analysis (FDA), maintenance operational quality assurance (MOQA), flight condition alarms, distress events, etc. Analytics 150 may be used by safety personnel 160 to monitor flight status, transmit commands to, for example, aircraft 110, flight crew, the aircraft data systems, etc., request additional information from, for example, server 130, aircraft 110, the aircraft data systems, etc., or perform regular maintenance of a cockpit voice recorder/flight data recorder (CVFFDR).

Figure 2:
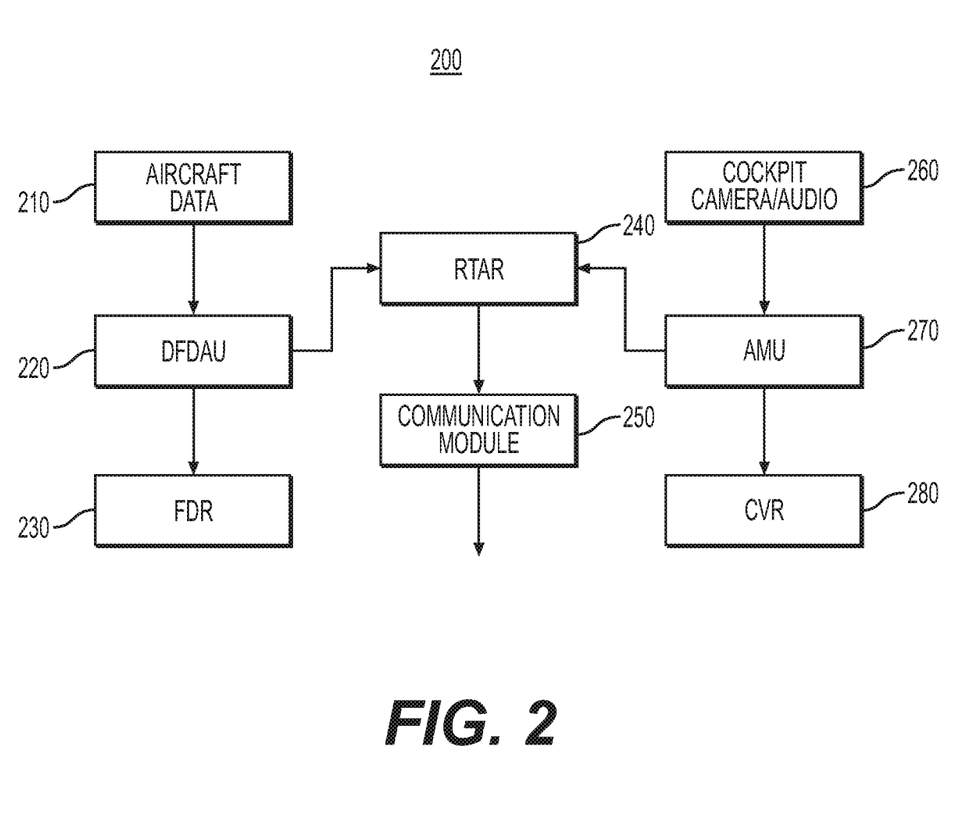
FIG. 2 depicts an exemplary system infrastructure for real-time streaming of flight data, according to one or more embodiments.

FIG. 2 depicts a schematic overview of exemplary system infrastructure for real-time streaming of flight data 200, according to one or more embodiments. As shown in FIG. 2, aircraft flight data 200 may include aircraft data 210 and cockpit camera/audio data 260. Aircraft data 210 may be provided to a real time access recorder (RTAR) 240 and to a digital flight data acquisition unit (DFDAU) 220. DFDAU 220 may provide aircraft data 210 to a flight data recorder (FDR) 230, where it may be recorded. Cockpit camera/audio data 260 may be provided to RTAR 240 and to an audio management unit (AMU) 270. AMU 270 may provide cockpit camera/audio data 260 to a cockpit voice recorder (CVR) 280, where it may be recorded. RTAR 240 may provide aircraft data 210 and cockpit camera/audio data 260 to a communication module 250. Communication module 250 may transmit aircraft data 210 and cockpit camera/audio data 260 to a ground station, such as ground station 130 depicted in FIG. 1. Although depicted as separate units, FDR 230 and CVR 280 may be combined in a single cockpit voice recorder/flight data recorder CVRFDR, such as CVRFDR 310 depicted in FIGS. 3A-3C.

RTAR 240 may be hosted on a line replaceable unit (LRU) having direct access to aircraft data 210 and cockpit camera/audio data 260 data streams. The functions provided by RTAR 240 may be host platform independent and could be hosted in various LRUs depending on available CPU/RAM resources of the LRU. For example, RTAR 240 may be hosted in a satellite communication terminal (SATCOM), FDR 230 or CVRFDR 310, DFDAU 220, a quick access recorder (QAR) unit, such as a streaming QAR. RTAR 240 may be configured to stream compressed or uncompressed data stream comprising aircraft data 210 and cockpit camera/audio data 260. However, additional data streams may be also be available. RTAR 240 may be configured to parse frames of streamed data down to parameters level to in order to possibly reduce bandwidth of streamed data. RTAR 240 may be configured to be reconfigured remotely, such as by safety or support personnel on the ground. RTAR 240 may be configured to differentiate parameters of streamed data and create multiple data streams. For example, aircraft data 210 may be streamed over secured satellite transmission, such as SBB-S, while cockpit camera/audio data 260 may be encrypted and streamed over a radio transmission, such as $K_a$ band. RTAR 240 may be configured to provide enhanced cyber security and data protection to ensure data are properly encrypted.

Figure 3A:
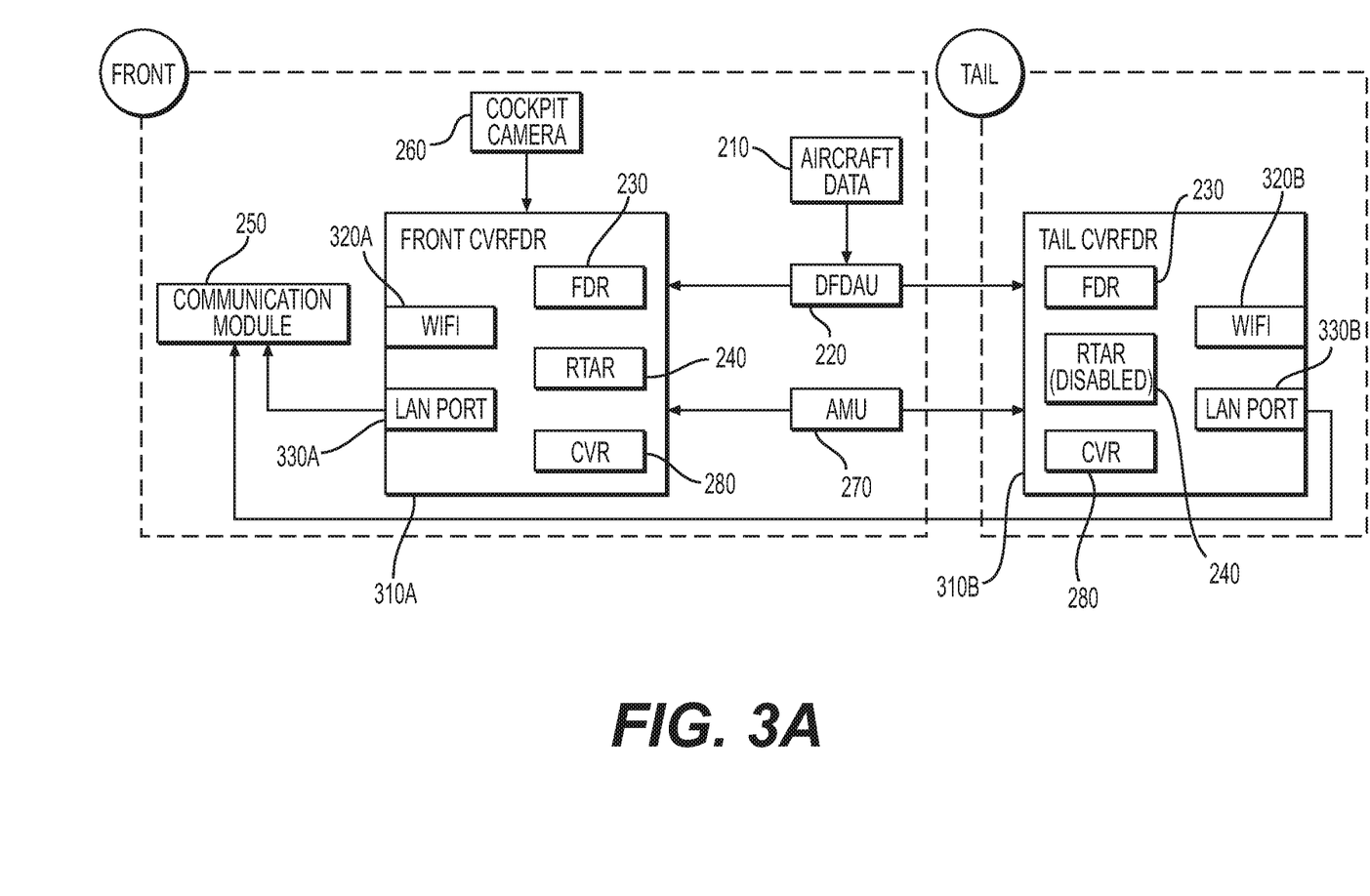
FIGS. 3A-3C depict exemplary system infrastructures for real-time streaming of flight data, according to one or more embodiments.
Figure 3B:
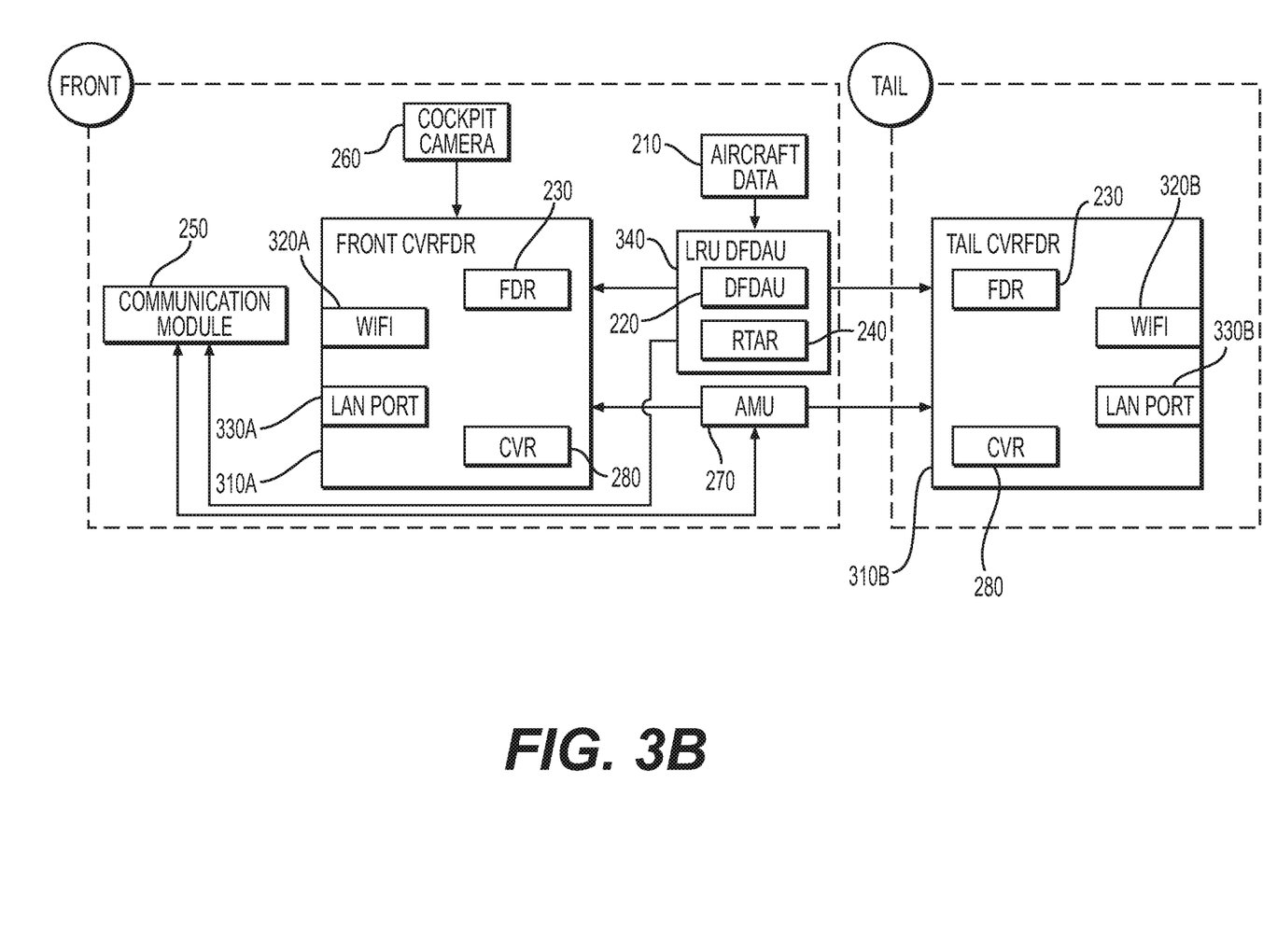
Figure 3C:
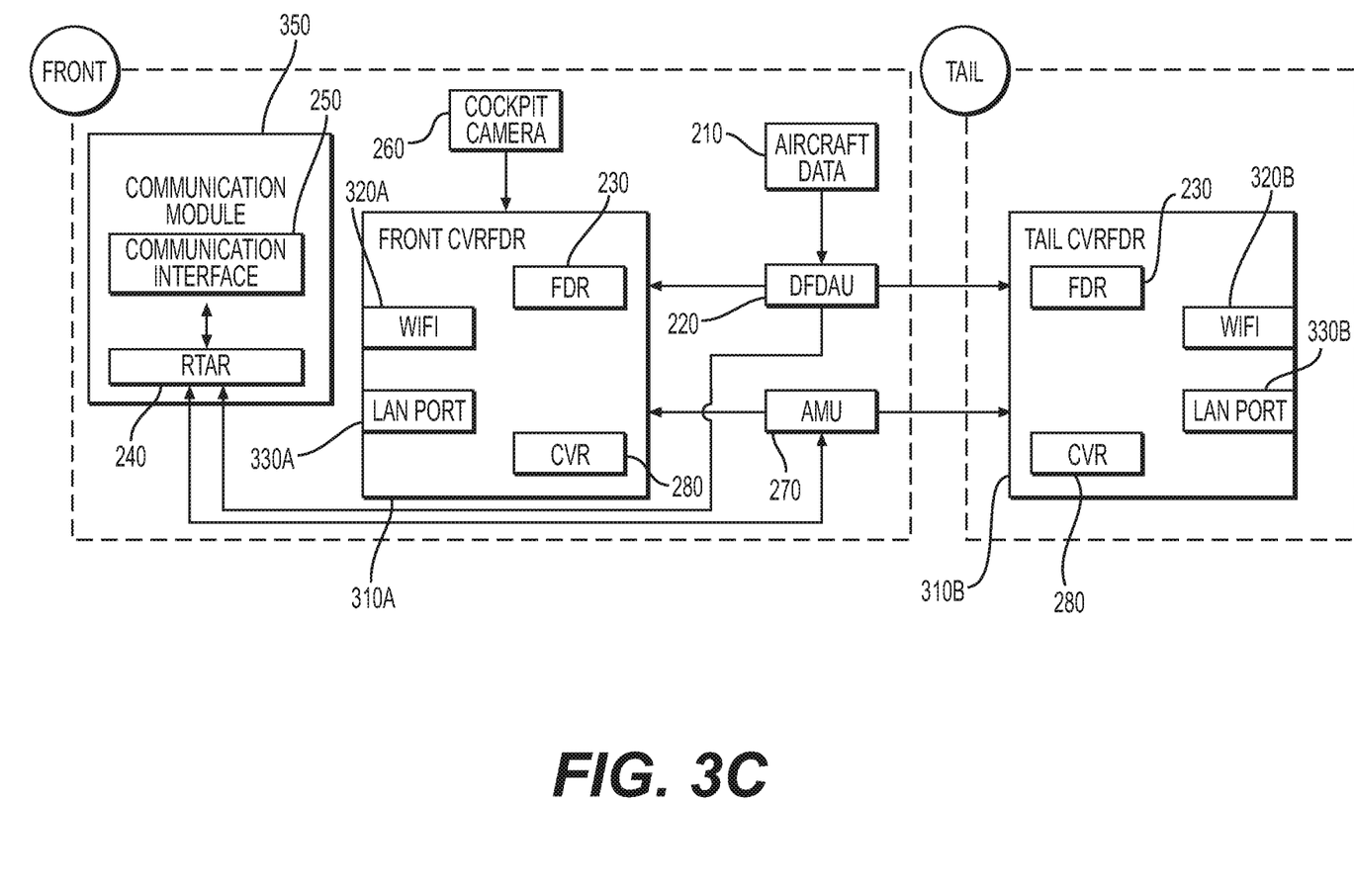

As discussed above, RTAR 240 may be hosted in various LRUs depending on available CPU/RAM resources of the LRU. Accordingly, RTAR 240 may be located in various locations within aircraft 110. Furthermore, multiple RTAR 240 units may be present in a single aircraft. FIGS. 3A-3C depict exemplary system infrastructures for real-time streaming of flight data, in which RTAR 240 is deployed in various LRUs in various locations in aircraft 110, according to one or more embodiments.

As shown in FIG. 3A, aircraft 110 may be equipped with multiple CVRFDR LRUs, such as, for example, a front CVRFDR 310a, which may be located in the front section of aircraft 110, and a tail CVRFDR 310b, which may be located in the tail section of aircraft 110. RTAR 240 may be deployed as a component of any CVRFDR present in aircraft 110, or may be deployed as components of multiple CVRFDR units. If multiple RTAR units are deployed, then one or more RTAR units may be disabled. For example, as shown in FIG. 3C, RTAR 240 deployed with CVRFDR 310B may be disabled. Alternatively, in some configurations, one CVRFDR, such as front CVRFDR 310a may provide data from CVR 280 to adjacent RTAR 240 and another CVRFDR, such as tail CVRFDR 310b may provide data from FDR 230 to adjacent RTAR 240. In such a configuration, more than one RTAR 240 may be active. Each CVRFDR may include a WiFi communication module 320 and a local area network (LAN) port 330 for communications functions. For example, LAN port 330 may be used to communicate with communication module 250.

As shown in FIG. 3A, because RTAR 240 is located with FDR 230, access to all mandatory flight data recorded by FDR 230 is assured. Likewise, locating RTAR 240 with CVR 280 assures access to all mandatory cockpit audio recorded by CVR 280. Cockpit audio may be converted from analog to digital, and all necessary circuits including encoding/decoding (codec) circuits and analog-to-digital converters (ADCs) may be provided as part of CVR 280. In addition, CVRFDR 310 is a mandatory LRU, so adding the RTAR functionality may provide additional value from a required LRU. Making use of an existing LRU that receives the necessary data may reduce integration cost by eliminating extra wiring needed to install an additional LRU. Such a configuration further may ensure that RTAR 240 receives the same data samples recorded by crash-protected memory in FDR 230 and CVR 280 without any differences in sample rates or timing.

As discussed above, aircraft 110 may be equipped with DFDAU 220. DFDAU 220 may be housed in an LRU, such as LRU DFDAU 340 depicted in FIG. 3B. In such a configuration, RTAR 240 may be housed within LRU DFDAU 340 and may receive flight data from DFDAU 220 and cockpit voice data from AMU 270, depicted in FIG. 3B. Such a configuration may provide access to all parameters available on various buses that are made available to DFDAU 220. In addition, CVRFDR 310 is an existing LRU, so adding the RTAR functionality may provide additional value from an existing LRU. Making use of an existing LRU that receives the necessary data may reduce integration cost by eliminating extra wiring needed to install an additional LRU. Such a configuration may represent a system centric solution, with RTAR 240 being located at the source of the data to be recorded or streamed.

As discussed above, aircraft 110 may be equipped with communication module 250 that may transmit aircraft data 210 and cockpit camera/audio data 260 to a ground station, such as ground station 130 depicted in FIG. 1. As shown in FIG. 3C, RTAR 240 and communication interface 250 may be housed in a communication module LRU 350. Such a configuration may allow RTAR 240 to be deployed close to the point of data transmission and, thus, having RTAR 240 and communication interface 250 in a single LRU. This configuration allows a single manufacturer to provide RTAR 240 and communication interface 250, potentially avoiding costs associated with integrating devices from multiple manufacturers.

Figure 4:
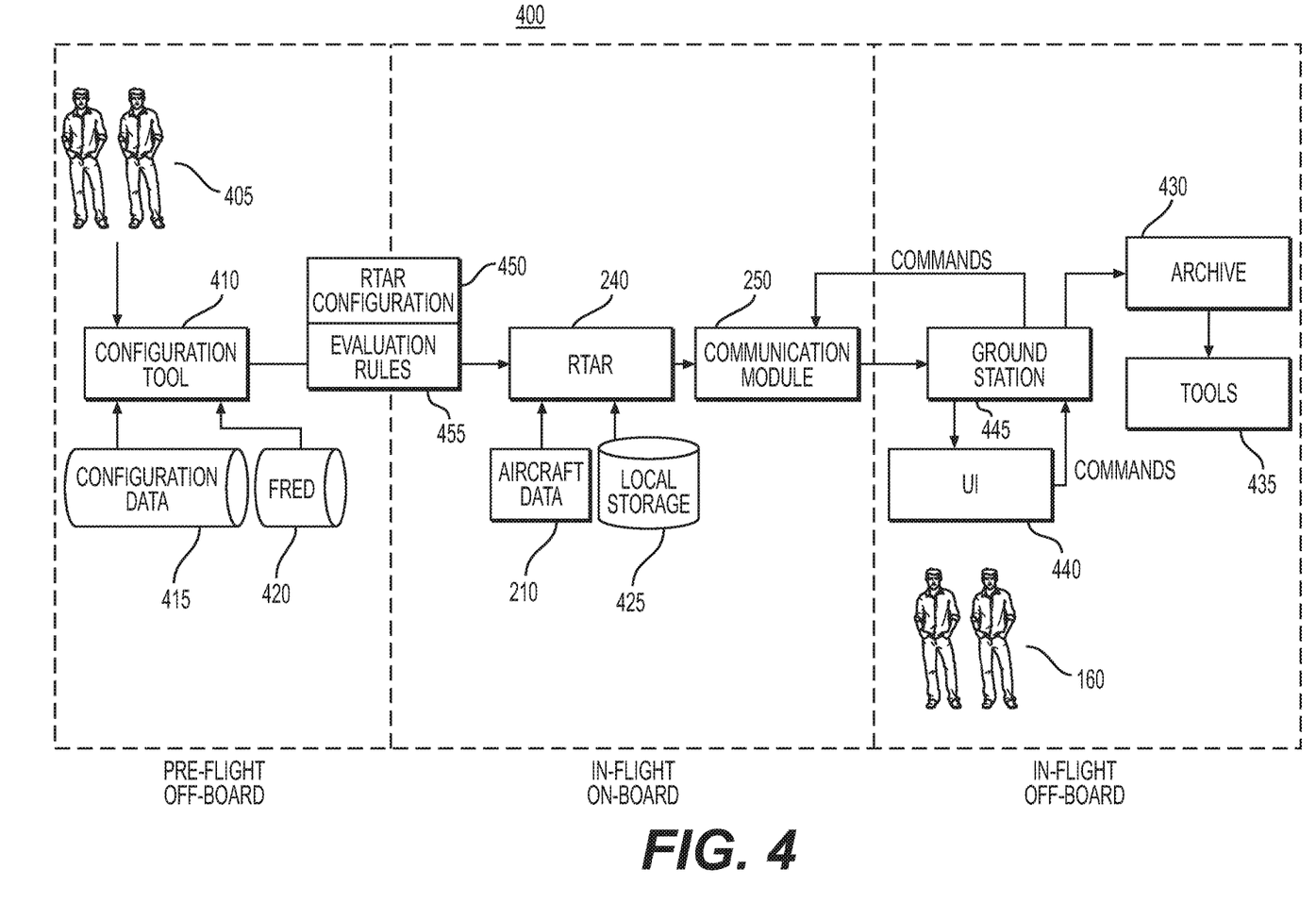
FIG. 4 depicts an exemplary flow of information in a method of real-time streaming of flight data, according to one or more embodiments.

FIG. 4 depicts an exemplary flow of information in a method of real-time streaming of flight data, according to one or more embodiments. As shown in FIG. 4, system administrator 405 may operate configuration tool 410 to process configuration data 415 and flight recorder electronic documentation (FRED) 420. Such processing may produce a configuration 450 for RTAR 240 and one or more data evaluation rules 455 based on FRED 420 and configuration data 415. Such processing may be performed prior to a flight by aircraft 110, and may be performed elsewhere than on board aircraft 110. The generated configuration for RTAR 240 and one or more data evaluation rules may be transmitted to RTAR 240. RTAR 240 may then be configured according to the generated configuration data.

During a flight by aircraft 110, RTAR 240 may receive aircraft data 210 from one or more aircraft systems. The received aircraft data 210 may be processed according the one or more data evaluation rules. This may allow RTAR 240 to operate in different configurations according to the desires of the aircraft operator and/or controlling regulations. For example, RTAR 240 may operate in a minimalistic streamer mode in which RTAR 240 acquires aircraft data 210 and parses it without the FRED specification information 420. That is, RTAR 240 may parse aircraft data 210 on the level of individual frames. Without the FRED specification, it is possible to recognize frames, but individual parameters within the frames are may not be recognized. The frames may then be stored in local storage 425 or streamed un-decoded to ground station 130 for storage and further processing. Alternatively, RTAR 240 may operate in a context capable streamer mode in which RTAR 240 parses aircraft data 210 according to the FRED specification information 420. Parsing data according to the FRED specification, may allow RTAR 240 to recognize individual parameters within the frames of aircraft data 210. Knowledge of the individual parameters may allow RTAR 240 to perform enhanced functions such as, for example, data selection for a subset of parameters or information contained within aircraft data 210, data evaluation and application of trigger logic to allow selective responses based on the presence and values of certain parameters within aircraft data 210, output format change to save or stream aircraft data 210 in a format other than the native format produced by the aircraft systems, enhanced context compression to further reduce the stored or streamed size of aircraft data 210.

In another alternative, RTAR 240 may operate in a distress streamer mode in which RTAR 240 acquires aircraft data 210 and parses it on the level of individual parameters. A distress or trigger logic may be loaded at run time, such as in the configuration or data evaluation rules, or may be built in RTAR 240 to evaluate the individual parameters of aircraft data 210 and trigger a specific action. This action may be defined alongside the trigger logic or can be built into the system. The action may be, for example, starting or stopping transmission of aircraft data 210 at given rate, modifying the rate at which aircraft data 210 is transmitted, starting or stopping transmission of voice data 260, sending a signal to other aircraft systems. Such a configuration may, for example, allow RTAR 240 to recognize, based on the parsed parameters of aircraft data 210, certain conditions of aircraft 110 under which streaming of aircraft data 210 and voice data 260 to ground station 130 should be initiated. Such selective streaming of aircraft data 210 and voice data 260 may provide advantages in reducing costs to the operator of aircraft 110, such as for access to satellite 120, in reducing the use of processing power and storage capacity of RTAR 240, etc.

Aircraft data 210 and voice data 260 may be provided to communication module 250, which may transmit aircraft data 210 and voice data 260 may to ground station 445. At ground station 445, aircraft data 210 and voice data 260 may be stored in data archive 430, from which aircraft data 210 and voice data 260 may be further analyzed using tools 435. Aircraft data 210 and voice data 260 may be provided to a user interface (UI) 440 by which ground personnel 160 may further analyze aircraft data 210 and voice data 260. Ground personnel 160 may take further actions based on the analysis including, for example, sending commands to ground station 445 to be relayed to aircraft 110 by way of communication module 250. The commands may include commands to, for example, control communication module 250, control RTAR 240, control other aircraft systems, relay information to personnel on aircraft 110, etc.

Figure 5:
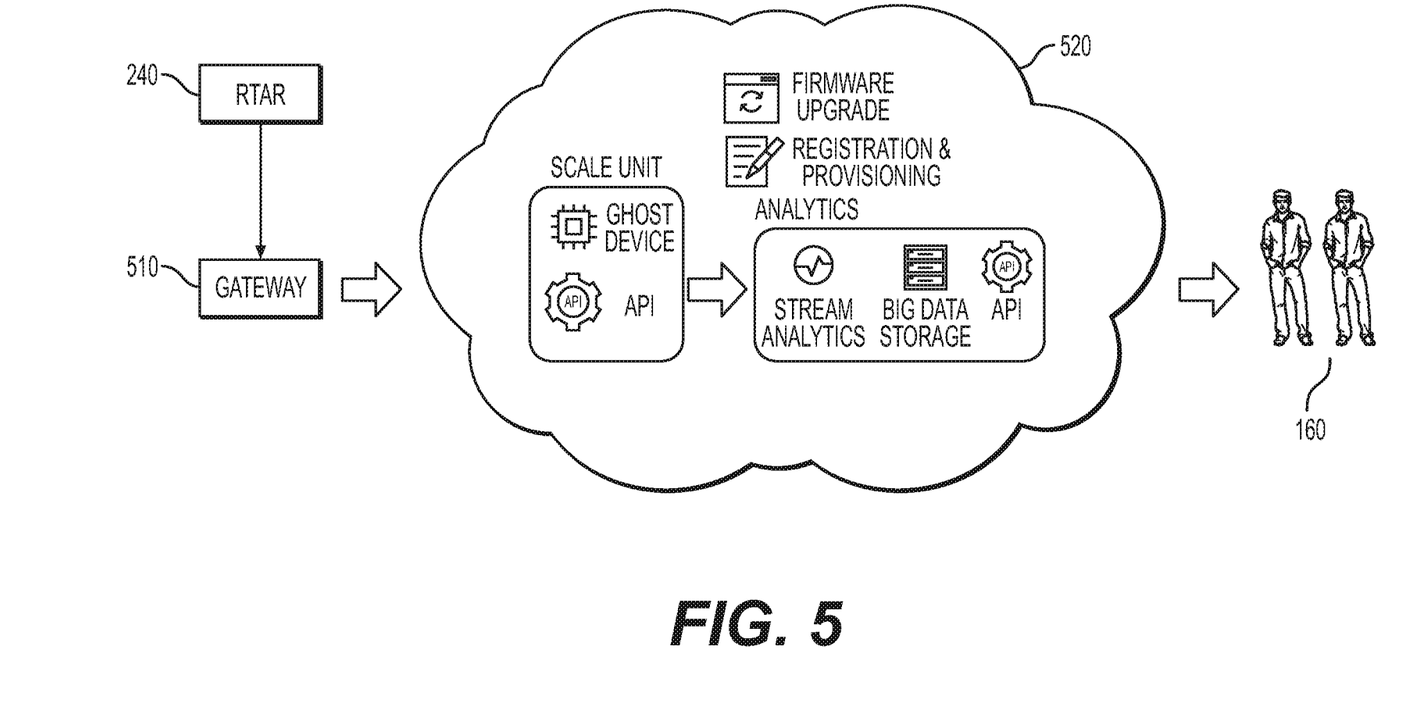
FIG. 5 depicts a cloud-based services in a method of real-time streaming of flight data, according to one or more embodiments.

FIG. 5 depicts a cloud-based services in a method of real-time streaming of flight data, according to one or more embodiments. As shown in FIG. 5, RTAR 240 may communicate with gateway 510 in order to provide data to one or more services hosted in could-based environment 520. Such cloud-based services may include, for example, firmware upgrades for RTAR 240 or other devices, registration and provisioning for RTAR 240 or other devices, providing analytics on the streamed data from RTAR 240, providing data storage for the streamed data from RTAR 240, etc. Access to the cloud-based services, such as stream analytics and stored data may be provided to ground personnel 160 by way of an application programming interface (API). An interface to the cloud-based services for RTAR 240 and/or gateway 510 may be provided by way of a scale unit providing, for example, an API and/or a ghost device.

Figure 6:
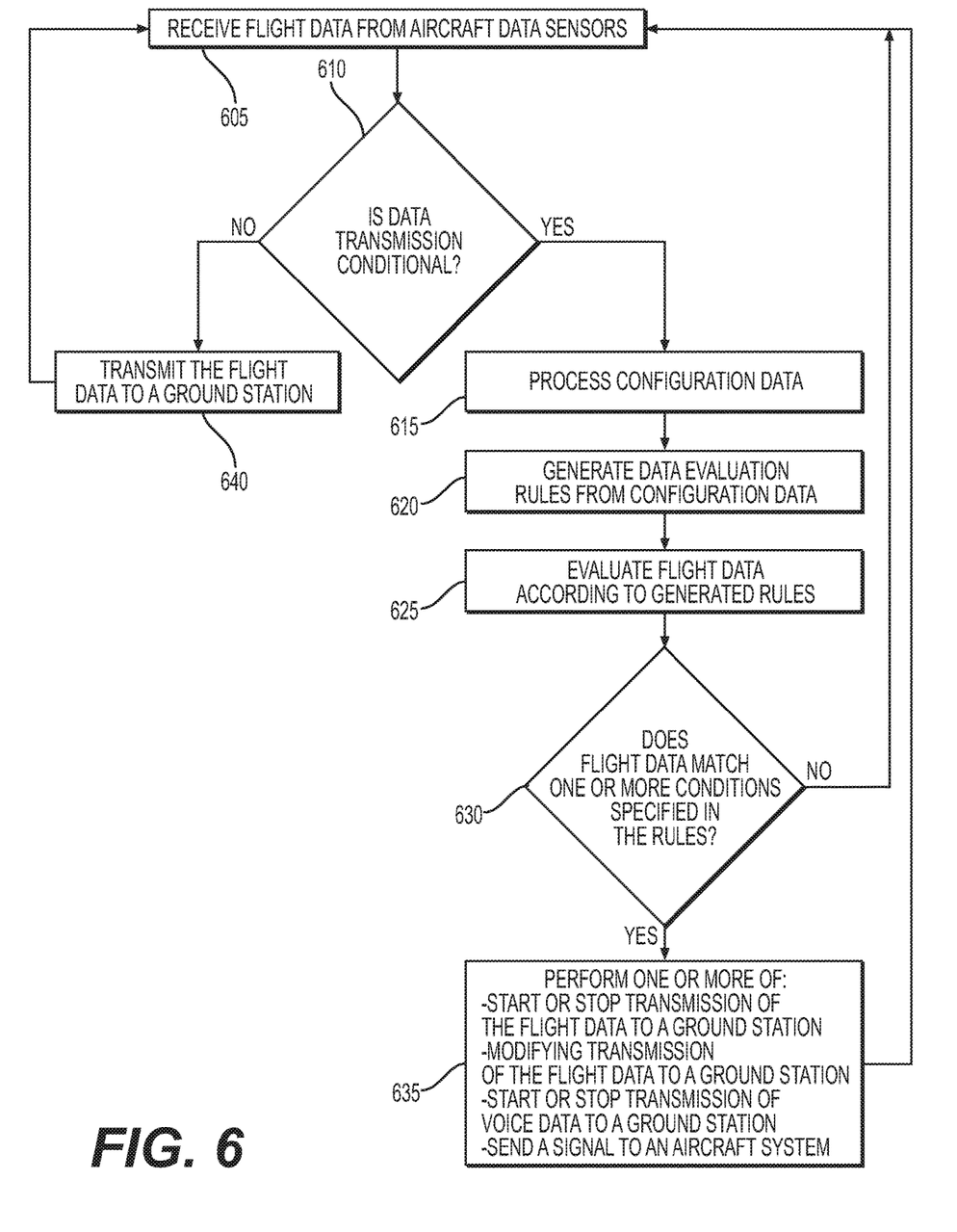
FIG. 6 depicts a flowchart of a method of real-time streaming of flight data, according to one or more embodiments.

FIG. 6 depicts a flowchart of a method of real-time streaming of flight data, according to one or more embodiments. As shown in FIG. 6, at operation 605, RTAR 240 may receive flight data from aircraft data sensors. At operation 610, RTAR 240 may determine whether the data transmission is conditional. If the data transmission is not conditional, then RTAR 240 may continue with operation 640. If data transmission is conditional, then RTAR 240 may continue with operation 615. At operation 615, RTAR 240 may process configuration data 415. At operation 620, RTAR 240 may generate data evaluation rules based on the processing of configuration data 415. At operation 625, RTAR 240 may evaluate the flight data according to the generated rules. At operation 630, RTAR 240 may determine whether the flight data matches one or more conditions specified in the generated rules. If the flight data does not match the one or more conditions, then RTAR 240 may return to operation 605. If flight data matches one or more conditions, then RTAR 240 may continue with operation 635. At operation 635, RTAR 240 may perform one or more operations such as, for example, starting or stopping a transmission of the flight data to ground station 130, modifying the transmission of the flight data to ground station 130, starting or stopping transmission of voice data to ground station 130, or sending a signal to an aircraft system. After performing operation 635, RTAR 240 may return to operation 605 to receive additional flight data from the aircraft data sensors. At operation 640, after determining that data transmission is not conditional, RTAR 240 may transmit the flight data and/or voice data to ground station 130. After performing operation 640, RTAR 240 may return to operation 605 to receive additional flight data from the aircraft data sensors.

Figure 7A:
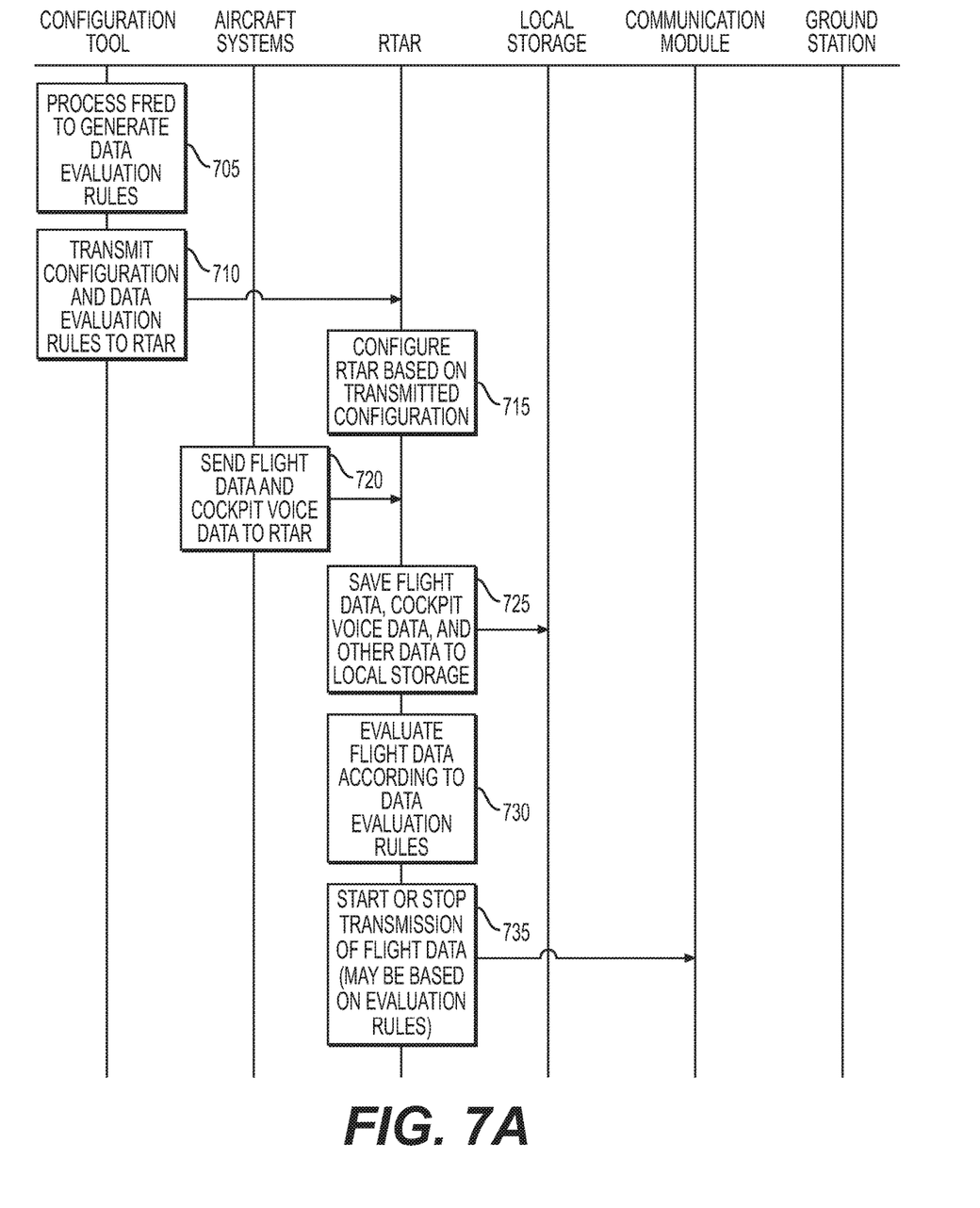
FIGS. 7A-7B depict a message flow in a method of real-time streaming of flight data, according to one or more embodiments.
Figure 7B:
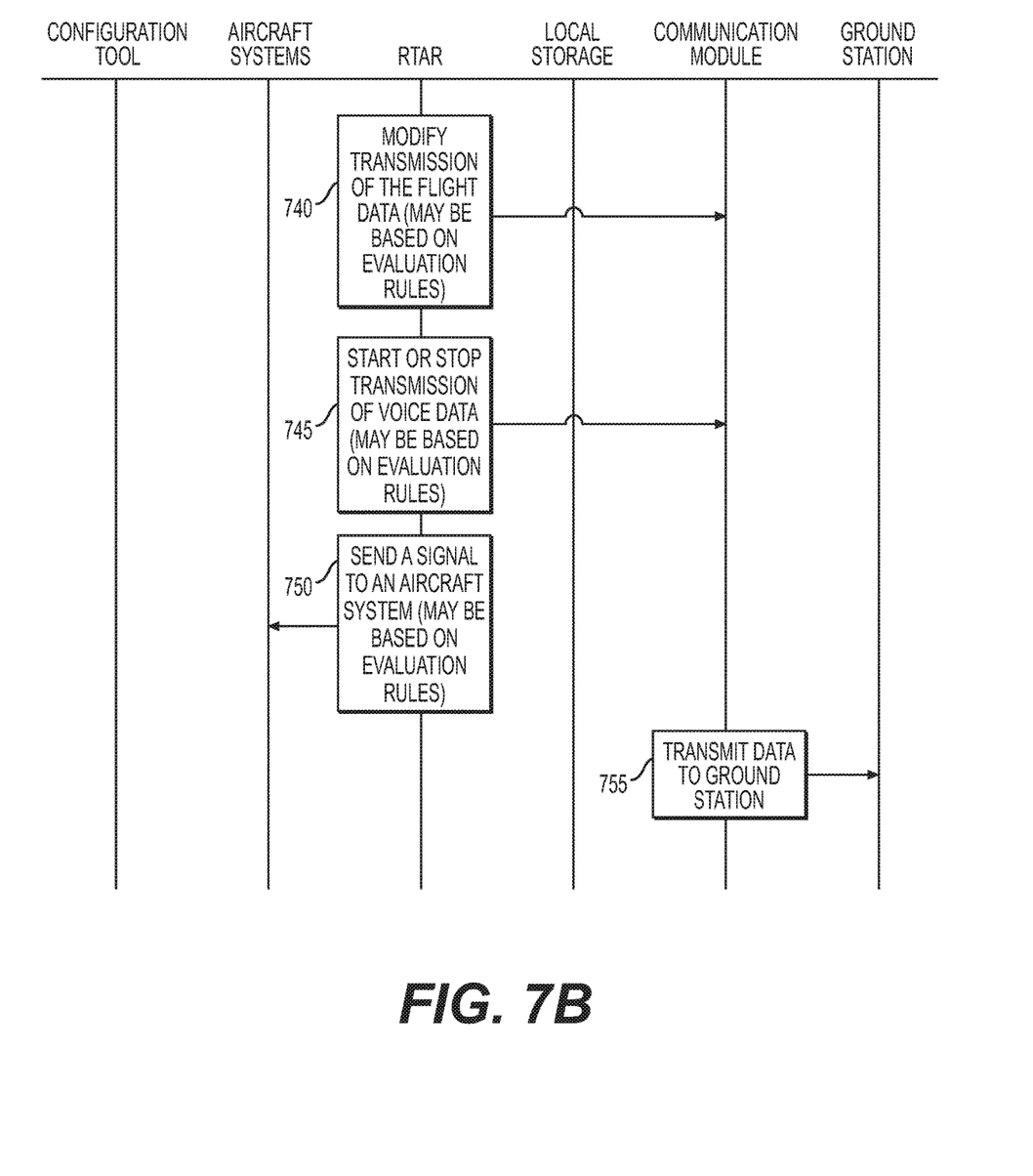

FIGS. 7A-7B depict a message flow in a method of real-time streaming of flight data, according to one or more embodiments. As shown in FIGS. 7A-7B, at operation 705, configuration tool 415 may process FRED 420 to generate data evaluation rules. At operation 710, configuration tool 415 may transmit configuration data 415 and the generated data evaluation rules to RTAR 240. At operation 715, RTAR 240 may configure RTAR 240 based on the transmitted configuration data. At operation 720, aircraft systems may send flight data 210 and cockpit voice data 260 to RTAR 240. At operation 725, RTAR 240 may save flight data 210, cockpit voice data 260, and other data to local storage 425. At operation 730, RTAR 240 may evaluate flight data 210 according to the received data evaluation rules. At operation 735, RTAR 240 may start or stop a transmission of flight data 210 to ground station 445 by way of communication module 250. This operation may be based on the received data evaluation rules. At operation 740, RTAR 240 may modify the transmission of the flight data 210. This operation may be based on the received data evaluation rules. At operation 745, RTAR 240 may start or stop a transmission of voice data 260 to ground station 445 by way of communication module 250. This operation may be based on the received data evaluation rules. At operation 750, RTAR 240 may send a signal to an aircraft system. This operation may be based on the received data evaluation rules. At operation 755, communication module 250 may transmit the flight data and voice data to ground station 445.

Figure 8:
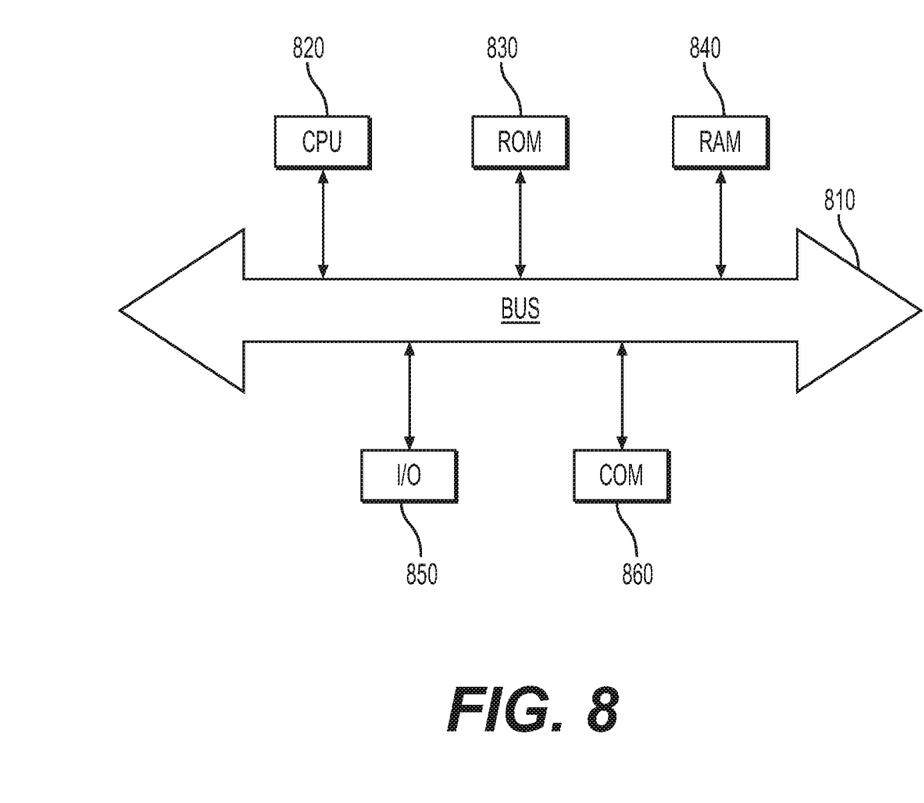
FIG. 8 depicts an exemplary device in which one or more embodiments may be implemented.

FIG. 8 illustrates a high-level functional block diagram of an exemplary device 800, in which embodiments of the present disclosure, or portions thereof, may be implemented, e.g., as computer-readable code. For example, each of the exemplary systems, user interfaces and methods described above with respect to FIGS. 1-7 can be implemented in device 800 using hardware, software, firmware, tangible computer readable media having instructions stored thereon, or a combination thereof and may be implemented in one or more computer systems or other processing systems. Hardware, software, or any combination of such may implement each of the exemplary systems, user interfaces and methods described above with respect to FIGS. 1-7.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the present disclosure, as described above in the examples of FIGS. 1-7 may be implemented using device 800. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 8, device 800 may include a central processing unit (CPU) 820. CPU 820 may be any type of processor device including, for example, any type of special purpose or a general purpose microprocessor device. As will be appreciated by persons skilled in the relevant art, CPU 820 also may be a single processor in a multi-core/multi-processor system, such system operating alone, or in a cluster of computing devices operating in a cluster or server farm. CPU 820 may be connected to a data communication infrastructure 810, for example, a bus, message queue, network, or multi-core message-passing scheme.

Device 800 may also include a main memory 840, for example, random access memory (RAM), and may also include a secondary memory 830. Secondary memory 830, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 830 may include other similar means for allowing computer programs or other instructions to be loaded into device 800. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 800.

Device 800 may also include a communications interface ("COM") 860. Communications interface 860 allows software and data to be transferred between device 800 and external devices. Communications interface 860 may include a modem, a network interface (such as an Ethernet card), a communications port, a PCMCIA slot and card, or the like. Software and data transferred via communications interface 860 may be in the form of signals, which may be electronic, electromagnetic, optical, or other signals capable of being received by communications interface 860. These signals may be provided to communications interface 860 via a communications path of device 800, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 800 also may include input and output ports 850 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for real-time streaming of flight data, the method comprising:
receiving a configuration for a real-time access recorder (RTAR) and data evaluation rules for evaluating flight data using the RTAR, wherein the configuration for the RTAR and the data evaluation rules are based at least in part on a flight recorder electronic documentation and configuration data, wherein the configuration for the RTAR configures the RTAR to be active or disabled on a communication module, a digital flight data acquisition unit, a flight data recorder, a cockpit voice recorder, or a cockpit voice recorder/flight data recorder in a streamer mode, a context capable streamer mode, or a distress streamer mode; and
when the RTAR is active:
receiving flight data from one or more aircraft data sensors;
evaluating the received flight data according to the received data evaluation rules; and
upon determining that the received flight data matches one or more conditions specified in the received data evaluation rules, starting or stopping a transmission of the received flight data to a ground station.

2. The computer-implemented method of claim 1, wherein the received flight data comprises parameters collected from one or more avionics systems and cockpit audio data.

3. The computer-implemented method of claim 1, wherein the transmission of the received flight data is by way of a satellite data stream, a cellular data network, or a direct radio connection.

4. The computer-implemented method of claim 1, further comprising:
receiving, from the ground station, commands to control one or more components of an aircraft.

5. The computer-implemented method of claim 1, further comprising:
upon determining that the received flight data matches the one or more conditions specified in the received data evaluation rules, performing one or more additional operations on the received flight data, the one or more additional operations including at least one of:
modifying a transmission rate of the received flight data to the ground station;
starting or stopping a transmission of related voice data to the ground station; and
sending a signal to at least one aircraft system.

6. The computer-implemented method of claim 1, further comprising, when the RTAR is in the context capable streamer mode:
parsing frames of the receiving flight data; and
compressing the receiving flight data based on parameters of the parsed frames.

7. A system for real-time streaming of flight data, the system comprising:
a communication module; and
a first real-time access recorder (RTAR) comprising:
a data storage device storing instructions for real-time streaming of flight data in an electronic storage medium; and
a processor configured to execute the instructions to perform a method including:
receiving a configuration for the first RTAR and data evaluation rules for evaluating flight data, wherein the configuration for the first RTAR and the data evaluation rules are based at least in part on a flight recorder electronic documentation and configuration data, wherein the configuration for the first RTAR configures the first RTAR to be active or disabled on the communication module, a digital flight data acquisition unit, a flight data recorder, a cockpit voice recorder, or a cockpit voice recorder/flight data recorder (CVRFDR) in a streamer mode, a context capable streamer mode, or a distress streamer mode; and when the first RTAR is active:
receiving flight data from one or more aircraft data sensors;
evaluating the received flight data according to the received data evaluation rules; and
upon determining that the received flight data matches one or more conditions specified in the received data evaluation rules, starting or stopping a transmission of the received flight data to a ground station.

8. The system of claim 7, wherein the received flight data comprises parameters collected from one or more avionics systems and cockpit audio data.

9. The system of claim 7, wherein the transmission of the received flight data is by way of a satellite data stream, a cellular data network, or a direct radio connection.

10. The system of claim 7, the performed method further comprising:
receiving, from the ground station, commands to control one or more components of an aircraft.

11. The system of claim 7, the performed method further comprising:
upon determining that the received flight data matches the one or more conditions specified in the received data evaluation rules, performing one or more additional operations on the received flight data, the one or more additional operations including at least one of:
modifying a transmission rate of the received flight data to the ground station;
starting or stopping a transmission of related voice data to the ground station; and
sending a signal to at least one aircraft system.

12. The system of claim 7, the performed method further comprising, when the first RTAR is in the context capable streamer mode:
parsing frames of the receiving flight data; and
compressing the receiving flight data based on parameters of the parsed frames.

13. The system of claim 7, wherein the first RTAR is a component of the communication module.

14. The system of claim 7,
wherein the first RTAR is a component of the CVRFDR.

15. The system of claim 14, wherein the CVRFDR is a first CVRFDR, and the system further includes a second CVRFDR comprising a second RTAR,
wherein one of the first RTAR and the second RTAR is disabled.

16. A non-transitory machine-readable medium storing instructions that, when executed by a computing system, causes the computing system to perform a method for real-time streaming of flight data, the method including:
receiving a configuration for a real-time access recorder (RTAR) and data evaluation rules for evaluating flight data using the RTAR, wherein the configuration for the RTAR and the data evaluation rules are based at least in part on a flight recorder electronic documentation and configuration data, wherein the configuration for the RTAR configures the RTAR to be active or disabled on a communication module, a digital flight data acquisition unit, a flight data recorder, a cockpit voice recorder, or a cockpit voice recorder/flight data recorder in a streamer mode, a context capable streamer mode, or a distress streamer mode; and
when the RTAR is active:
receiving flight data from one or more aircraft data sensors;
evaluating the received flight data according to the received data evaluation rules; and
upon determining that the received flight data matches one or more conditions specified in the received data evaluation rules, starting or stopping a transmission of the received flight data to a ground station.

17. The non-transitory machine-readable medium of claim 16, wherein the received flight data comprises parameters collected from one or more avionics systems and cockpit audio data.

18. The non-transitory machine-readable medium of claim 16, wherein the transmission of the received flight data is by way of a satellite data stream, a cellular data network, or a direct radio connection.

19. The non-transitory machine-readable medium of claim 16, the method further comprising:
receiving, from the ground station, commands to control one or more components of an aircraft.

20. The non-transitory machine-readable medium of claim 16, the method further comprising:
upon determining that the received flight data matches the one or more conditions specified in the received data evaluation rules, performing one or more additional operations on the received flight data, the one or more additional operations including at least one of:
modifying a transmission rate of the received flight data to the ground station;
starting or stopping a transmission of related voice data to the ground station; and
sending a signal to at least one aircraft system.

* * * * *